US008868751B2

(12) United States Patent
Kylau et al.

(10) Patent No.: US 8,868,751 B2
(45) Date of Patent: Oct. 21, 2014

(54) FRAMEWORK FOR DIVERSIFIED PROVISIONING OF SERVICES INTO BUSINESS NETWORKS

(75) Inventors: Uwe Kylau, Bulimba (AU); Alistair Barros, Camira (AU); Anis Charfi, Darmstadt (DE); Markus Heller, Bretten (DE); Matthias Allgaier, Bernstadt (DE); Michael Stollberg, Dresden (DE); Benjamin Schmeling, Seeheim-Jugenheim (DE)

(73) Assignee: SAP SE, Walldorf (DE)

( * ) Notice: Subject to any disclaimer, the term of this patent is extended or adjusted under 35 U.S.C. 154(b) by 707 days.

(21) Appl. No.: 13/074,218

(22) Filed: Mar. 29, 2011

(65) Prior Publication Data

US 2012/0254431 A1    Oct. 4, 2012

(51) Int. Cl.
*G06F 15/173* (2006.01)
*G06F 15/16* (2006.01)
*G06F 9/54* (2006.01)

(52) U.S. Cl.
CPC ........................................ *G06F 9/54* (2013.01)
USPC ........................... 709/226; 709/221; 709/223

(58) Field of Classification Search
CPC ..................... H04L 29/08144; H04L 41/0213; H04L 29/06
USPC ......................................................... 709/226
See application file for complete search history.

(56) References Cited

U.S. PATENT DOCUMENTS

| 8,346,729 | B2 * | 1/2013 | Brannon et al. | 707/661 |
| 2003/0041131 | A1 * | 2/2003 | Westerinen et al. | 709/221 |
| 2009/0287740 | A1 * | 11/2009 | Banerjee et al. | 707/104.1 |
| 2012/0159437 | A1 * | 6/2012 | Du et al. | 717/120 |

OTHER PUBLICATIONS

Barros et al., Service Delivery Framework—An Architectural Strategy for Next-Generation Service Delivery in Business Network, 2011 Annual SRII Global Conference, 2011 IEEE, pp. 702-714, 12 pages.
Barros et al., Diversified Service Provisioning in Global Business Networks, 2011 Annual SRII Global Conference, 2011 IEEE, pp. 47-58, 13 pages.

* cited by examiner

*Primary Examiner* — Tauqir Hussain
(74) *Attorney, Agent, or Firm* — Fish & Richardson P.C.

(57) ABSTRACT

Implementations of the present disclosure include methods for provisioning services in a business network. In some implementations, methods include receiving data corresponding to a first service, receiving data corresponding to a second service, processing the data corresponding to the first service and the data corresponding to the second service using a computer-executable tool selected from a plurality of computer-executable tools to enable provisioning of a service using the business network, and the processing being performed in a situational modeling layer of a service provisioning framework, generating a kernel model corresponding to the service, the generating being performed in a kernel modeling layer of the service provisioning framework, and storing the kernel model in computer-readable memory.

18 Claims, 10 Drawing Sheets

FRAMEWORK FOR DIVERSIFIED PROVISIONING OF SERVICES INTO BUSINESS NETWORKS

BACKGROUND

The growth in on-demand applications has surged to the point where demand is forecasted to exceed growth of on-premise applications in the coming years. Through software-as-service (SaaS) and cloud-based deployments accessed over the worldwide web (Web), on-demand offerings now extend to desktop, enterprise, supply chain management/logistics, utilities and many other segments. In response to this, a wave of "Appstore" initiatives has emerged as smaller software oriented architecture (SOA) style platforms to procure service-based software from central points and communities.

Attention is also turning to large enterprises and how large enterprises can leverage SaaS and marketplaces/hubs. For example, business applications in banks and financial institutes, public sector and manufacturing and other mainstream industries contain valuable data and functionality. In turn, these applications need to integrate with external services in order to enhance the decision making quality and other aspects of business processes. Having access to a reserve of external services can drastically reduce overhead and increase efficiencies in line-of-business activities.

Services in large enterprises relate to a myriad of applications in the form of multi-vendor suite solutions, home-grown applications and third-party, business process outsourcing (BPO) solutions, all operating within complex information technology (IT) landscapes and on-premise hosts. They are typically transactional, long-running and have complex data dependencies across different applications. This makes it difficult and sometimes impossible to create decoupled services that are redeployed onto external clouds. Unlike today's SaaS offerings, opening up transactional services for wider, commoditized use through marketplaces and hubs requires that services continue to execute from their secure, hosted environments.

Third-party business-to-business (B2B) gateways and integration platforms have emerged to reduce the costs of adapting and integrating transactional, enterprise services across trading partners. Because applications of trading partners are built independently, they face a complex integration challenges when opening up to business networks.

Taken together, the growth of the on-demand model adoption, now seen through platform accelerators in "Appstores," B2B gateways, BPO initiatives, service marketplaces and business network collaboration hubs, poses strategic uncertainties for the corporate world. Questions remain as to how customers best procure their services beyond organizational boundaries and also exploit services from the external environment, and how can such a strategy scale for all partners in business networks so that it fosters operational transformation on the business network. Correspondingly, software vendors are faced with the challenge of creating a comprehensive platform strategy for not only allowing their applications across different product segments and technology stacks to be accessed, as services, but also to support service access and delivery needs of partners in a business network.

SUMMARY

The present disclosure is generally directed to implementations of a service provisioning management framework (SPMF) for service provisioning in global business networks. The SPMF of the present disclosure enables an open-ended set of techniques for extending services through a rich, multi-tooling environment, and supports different modeling techniques through supportive tools to enable different parts of services to be integrated into new contexts. Integration of service user interfaces, business processes, operational interfaces and business object are supported. Integration specifications that arise from service extensions are uniformly reflected through a kernel technique, referred to as the service integration technique (SIT). The SPMF preserves coherence of service provisioning tasks without constraining the modeling techniques needed for extending different aspects of services.

Implementations of the present disclosure include computer-implemented methods for provisioning services in a business network. In some implementations, methods include receiving, at one or more processing devices, data corresponding to a first service, receiving, at the one or more processing devices, data corresponding to a second service, processing, using the one or more processing devices, the data corresponding to the first service and the data corresponding to the second service using a computer-executable tool selected from a plurality of computer-executable tools to enable provisioning of a service using the business network, and the processing being performed in a situational modeling layer of a service provisioning framework, generating a kernel model corresponding to the service, the generating being performed in a kernel modeling layer of the service provisioning framework, and storing the kernel model in computer-readable memory.

In some implementations, processing the first service and the second service generates integration specifications, the kernel model being generated based on the integration specifications.

In some implementations, the kernel model manages integration of input provided from each of the plurality of computer-executable tools.

In some implementations, methods further include displaying the kernel model on a display device.

In some implementations, wherein the service includes a third service, the third service including an integration of the first service and the second service wherein the third service is a brokered version of the first service, and is configured to be delivered through a run-time system of a service broker. The third service is configured to utilize components of the service broker based on the second service.

In some implementations, the first service is provided by a first service provider and the second service is provided by a second service provider. A service broker can be a service provider.

In some implementations, methods further include receiving user input, the user input being provided through the computer-executable tool, and annotating one or more tasks of the first service based on the user input to provide one or more annotations, each of the one or more annotations defining a condition of a state of a state machine that corresponds to the second service. In some implementations, methods further include identifying a set of reachable states based on a task of the one or more tasks, wherein the one or more annotations of the task correspond to a reachable state of the set of reachable states. In some implementations, methods further include, for each task in the first service, collecting all annotations, for each annotation, determine possible entry states, and generating a chain of tasks based on the possible entry states, the chain of tasks being integrated into the first service.

In some implementations, methods further include selecting the second service from a plurality of second services, each second service in the plurality of second services corresponding to a variant of the second service. In some implementations, each variant is an industry-specific variant of the second service. In some implementations, the kernel model reflects each variant of the second service.

In some implementations, the service includes at least one of a provisioning service, an aggregating service, cloud-hosting service, gatewaying service, and a channelling service.

In some implementations, methods further include providing a computer-readable repository for each computer-executable tool of the plurality of computer-executable tools.

In some implementations, methods further include storing non-functional descriptions and business-oriented descriptions corresponding to the first service and the second service in computer-readable memory.

In some implementations, each computer-executable tools corresponds to a respective situational modeling technique.

In some implementations, the plurality of computer-executable tools include a user-interface editor, a business process editor, a service interface editor and a business object editor.

The present disclosure also provides a computer-readable storage medium coupled to one or more processing devices and having instructions stored thereon which, when executed by the one or more processing devices, cause the one or more processing devices to perform operations in accordance with implementations of the methods provided herein.

The present disclosure further provides a system for implementing the methods provided herein. The system includes one or more processing devices, and a computer-readable storage medium coupled to the one or more processing devices having instructions stored thereon which, when executed by the one or more processing devices, cause the one or more processing devices to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a service provisioning management framework (SPMF) for service provisioning in global business networks. The SPMF of the present disclosure enables an open-ended set of techniques for extending services through a rich, multi-tooling environment. The SPMF supports different modeling techniques through supportive tools to enable different parts of services to be integrated into new contexts. Integration of service user interfaces, business processes, operational interfaces and business object are supported. Integration specifications that arise from service extensions are uniformly reflected through a kernel technique, referred to as the service integration technique (SIT). The SPMF preserves coherence of service provisioning tasks without constraining the modeling techniques needed for extending different aspects of services.

Implementations of the SPMF will be described within the context of a service delivery framework (SDF). The SDF provides a comprehensive platform strategy for supporting global service provisioning and delivery for business networks and enables service providers to publish services to directories. The published services can be repurposed, traded and consumed. In particular, implementations of the SDF enables publishing and brokering of complex enterprise and business services, and enables these services to be hosted through one or more cloud services, for example. The services can be adapted through a choice of business-to-business (B2B) gateway services. The services can be aggregated by and channeled through third-parties.

In short, implementations of the SDF support diversified partnerships for provisioning of services to best-of-breed utility services and innovation resources over a network. By way of non-limiting example, and with reference to the Network Solutions Strategy provided by SAP AG of Waldorf, Germany, the SDF can be seen as a particular example of the network fabric that enables both SAP's solutions as well as those of partners and customers to be targeted towards on-demand economies and global trading networks. The SDF sets the stage for the next service-oriented revolution, referred variously as service ecosystems, future business value networks, and other forms of hubs and communities, underpinned by an Internet-scale infrastructure, to provide a level playing field for supply and demand of services on over the Internet.

Figure 1:
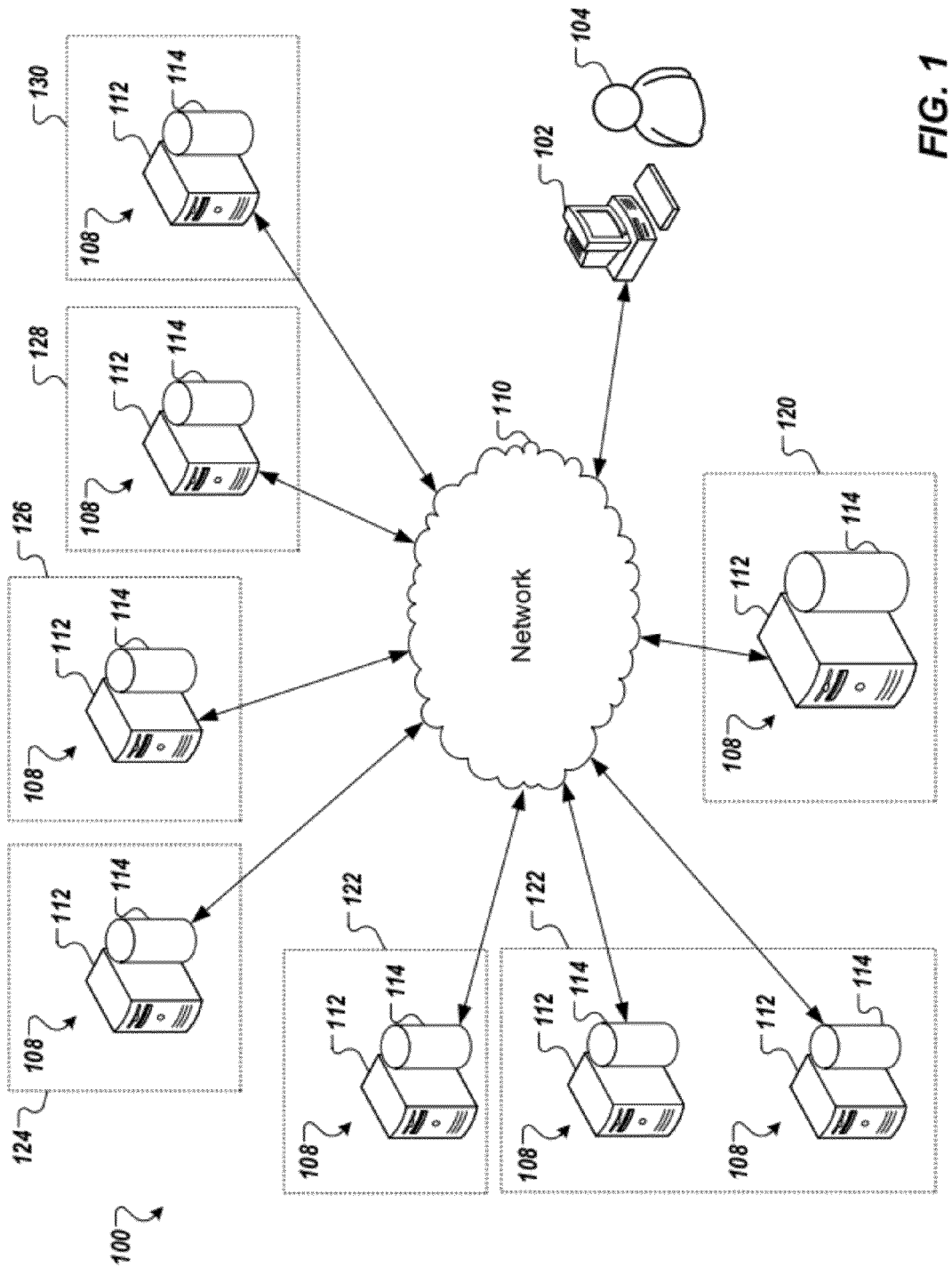
FIG. 1 depicts an example architecture that can execute implementations of a service delivery framework (SDF).

FIG. 1 depicts an example system architecture 100 that can execute implementations of the present disclosure. The system architecture 100 can include a client computing device 102 associated with a user 104 and computer systems 108. The client computing device 102 can communicate with one or more of the computer systems 108 over a network 110. The computer systems 108 can communicate with each other and/or the client computing device 102 over the network 110. The computer systems 108 can each include one or more servers 112 and one or more datastores 114, respectively. In some implementations, the system architecture 100 may represent a client/server system supporting multiple computer systems (e.g., computer systems 108) including one or more clients (e.g., client computing device 102) that are connectively coupled for communication with one another over the network 110.

The client computing device 102 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The client computing device 102 may access application software on one or more of the computer systems 108.

The computer systems 108 can represent various forms of server systems including, but not limited to a web server, an application server, a proxy server, a network server, or a server farm. For example, one or more of the servers 112 can be an application server that executes software accessed by the client computing device 102. In some implementations, a user can invoke applications available on one or more of the servers 108 in a web browser running on a client (e.g., client computing device 102). Each application can individually access data from one or more repository resources (e.g., datastores 112).

In some implementations, the client computing device 102 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

The network 110 can be a large computer network, such as a local area network (LAN), wide area network (WAN), the Internet, a cellular network, or a combination thereof connecting any number of mobile clients, fixed clients, and/or servers. In some implementations, each client (e.g., client computing device 102) can communicate with one or more of the computer systems 108 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

The client computing device 102 can establish its own session with the computer systems 108. Each session can involve two-way information exchange between the computer systems 108 and the client computing device 102. For example, a Hypertext Transfer Protocol (HTTP) session can allow the association of information with individual users. A session can be stateful session, in which at least one of the communicating parts (e.g., the computer systems 108 or the client computing device 102) stores information about the session history in order to be able to communicate. Alternatively, stateless communication during a stateless session includes independent requests with associated responses.

The example architecture 100 can be used to realize implementations of the SDF in accordance with the present disclosure. For example, the client computing device 102 and/or the user 104 can be provided as a service consumer that accesses and uses one or more services through the SDF. As discussed in further detail herein, the SDF includes a service broker 120, one or more service providers 122, one or more service aggregators 124, one or more service channel makers 126, one or more service hosters 128 and one or more service gateways 130.

The service broker 120 can be provided by a brokerage entity. Functionality of the service broker 120, discussed in further detail herein, can be realized using one or more computer systems 108, for example. The one or more service provides 122 can include corresponding service provider entities. Functionality of the service providers 122, discussed in further detail herein, can be realized using one or more computer systems 108, for example. The one or more service aggregators 124 can include corresponding service aggregator entities. Functionality of the service aggregators 124, discussed in further detail herein, can be realized using one or more computer systems 108, for example. The one or more service channel makers 126 can include corresponding service channel maker entities. Functionality of the service channel makers 126, discussed in further detail herein, can be realized using one or more computer systems 108, for example. The one or more service hosters 128 can include corresponding service hoster entities. Functionality of the service hosters 128, discussed in further detail herein, can be realized using one or more computer systems 108, for example. The one or more service gateways 128 can include corresponding service gateway entities. Functionality of the service gateways 128, discussed in further detail herein, can be realized using one or more computer systems 108, for example.

Figure 2:
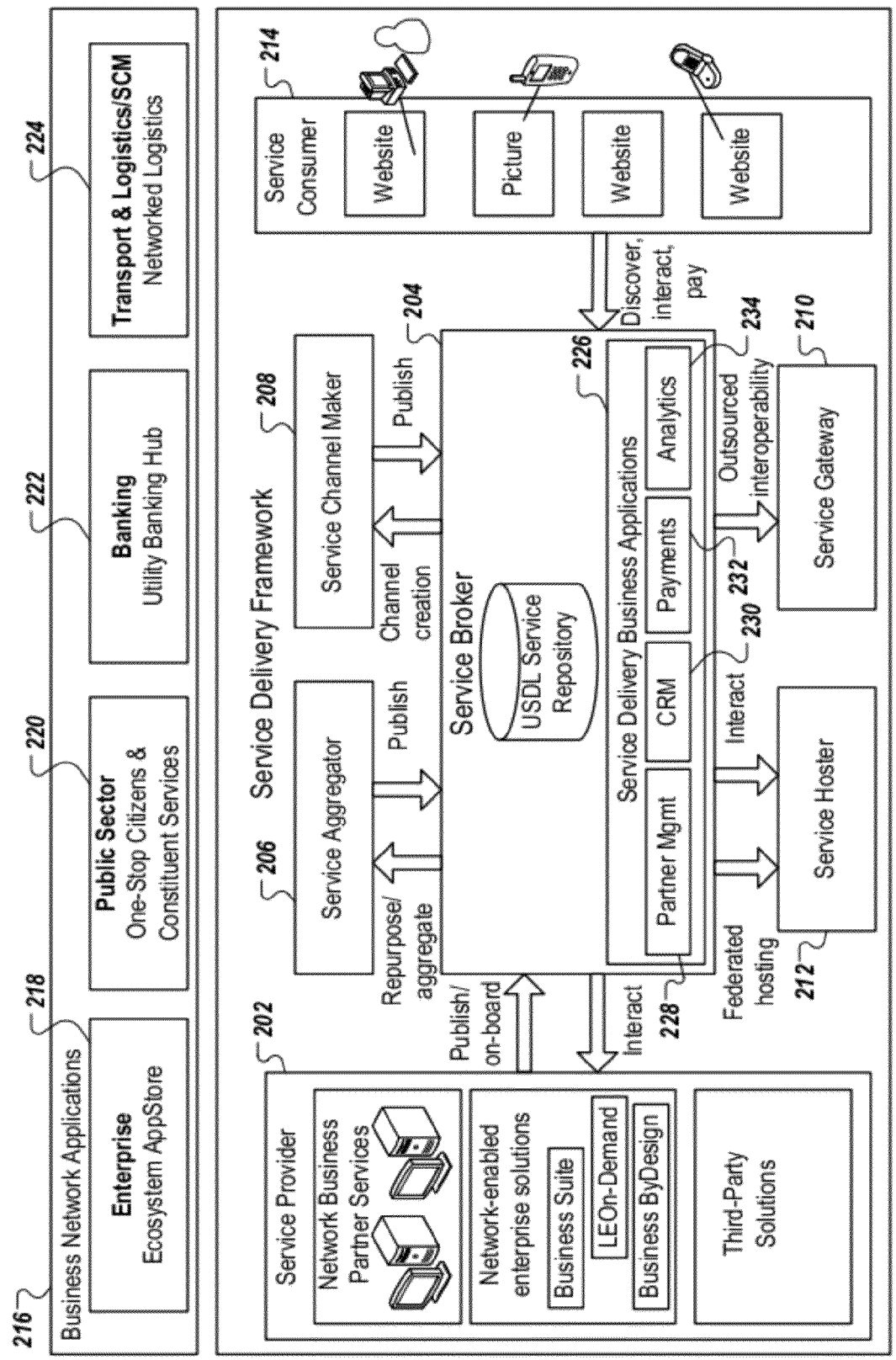
FIG. 2 is a block diagram of an example SDF.

FIG. 2 is a block diagram of an example SDF 200. The SDF 200 supports a diversity of provisioning partners as seen through different roles. In some implementations, the roles include service provider 202, service broker 204, and service aggregator 206. The SDF 200 further includes service channel maker 208, service gateway 210, service hoster 212 and service consumer 214. Different provisioning partners can use particular platform functionality dedicated for their service provisioning niches, as discussed in further detail below. The functionality offered through the SDF roles combines technical capabilities (e.g. service composition tools, service repository, service adaptation and runtime environment, network convergence) with business functionality (e.g. customer relations management (CRM), payments), for supporting diversity of service delivery. Service delivery can be drawn from a foundation layer of components accessed through a service-oriented architecture (SOA) enabled business process platform.

In some implementations, an architectural strategy for the SDF 200 recognizes that industry-specific applications 216 may be needed for business networks operating in different industries. Example applications that apply to industry-specific business networks (e.g., eGovernment platforms for one-stop citizens and constituent services) can provide user interfaces (UIs) and logic that, while coded against a generic SDF layer, are specific to particular domains. Example applications can include enterprise applications 218, public sector applications 220, banking applications 222, and transport and logistics applications 224. In some implementations, the applications can be separately deployed as on-premise installations for customers. In some implementations, the applications can be run as on-demand for several customers. Because a variety of domains are targeted, the SDF 200 supports a diversity of services and a diversity of consumption modes.

The service provider 202 supports partners that hold governance and operational responsibility for services through their business operations, business processes, and organizational units, as well as systems and other implementation artifacts. Each service provider 202 provides the dedicated tooling to engineer, expose and interface services, whether from scratch or from existing applications. For example, the service provider 202 supports companies that service-enable their applications by allowing the functional dependencies of applications to be visualized, analyzed for coupling and cohesion, and assessed for the costs and feasibility of a service interface layer. For example, representational state transfer (REST) style interfacing can be introduced as a layer over applications that are difficult to decouple. As another example, Web service description language (WSDL) interfaces can be generated for parts of applications that can be decoupled.

Each service provider 202 exposes services to a business network so that the services can be accessed without compromise to the mechanisms put in place by providers for service delivery. For example, a service provider should be able to publish a service to a third-party broker, while still requiring that the service run through the current hosting environment and be interacted with through a secure gateway. Some service providers may loosen constraints to access by allowing services to be re-hosted onto a third-party cloud, or downloaded and run in a service consumer's environment. In such a case, where the service is accessed through a third-party, the service provider 202 can ensure that the service is comprehensively described, at least for the benefit of service consumers 214. Such descriptions can include, for example, service ownership, functional descriptions, dependencies on other services, pricing, and consumer rights, penalties and obligations in terms of service performance, exceptions, information disclosure and other legal aspects. For services related in wider business contexts, domain-specific semantic descriptions, vertical industry standards and other documents containing service-related information (e.g., policy, legislation and best practices documents) are also useful to enhance service discovery and consumer comprehension of services. Such comprehensive descriptions can be linked to service descriptions and can be used during service discovery and access through unstructured search techniques.

Each service provider 202 interacts with the service broker 204 to publish, or on-board service details so that they can be accessed through the service broker 204. Example service details can include descriptions, execution artifacts and the like. As discussed in further detail herein, the service broker 204 is the central point of service access within the SDF 200. Each service provider 202 supports provider environments so that the services they host can be integrated with the service broker 204 for required inbound and outbound run-time interactions. The service providers 202 allow deployment of standard provider interfaces in provider environments. In this manner, interactions from the service broker 204 are guarded against security risks and convoluted logic of hosted service applications. Further, service providers 202 have well-defined and allowable operations exposed to them for interacting with the service broker 204.

The service broker 204 supports brokerage agencies that specialize in exposing services from diverse service providers 202 into new markets, matching consumer requests with capabilities of services advertised through the service broker 204. These brokerage agencies manage the "front-desk" delivery of services to consumers, without assuming "back-office" responsibility. Although services are accessed through the service broker 204, execution of the core parts of the services resides elsewhere in a hosted environment. The benefits for service providers 202 lie in reduced costs from outsourced delivery as well as exposure to new markets created by the service broker 204. The service broker 204 can enhance consumer pull through cost-offsets of advertisers, market analysts and other entities that benefit from making their businesses visible through other services.

The service broker 204 is central to the SDF 200 and is used to expose services from the service providers 202. The services can be on-boarded and delivered through the service delivery functionality of the service broker. Example service delivery functionality includes run-time service access environment, billing/invoicing, and metering. Services consumed through end users or applications, or services offered in a business network through intermediaries like cloud providers and B2B gateways, can each be published in the service broker 204. Third-parties can extend and repurpose services through the service broker 204. For example, a service aggregator 206 can use the directory facilities of the service broker 204 to discover and make use of services through design-time tooling, as discussed in further detail below. Ultimately service delivery is managed through the service broker 204 when services are accessed at run-time by service consumers 214. As discussed in further detail herein, example service consumers 214 can include end users, applications, and business processes. In short, the service broker 204 provides a directory and delivery resource for service access.

To support different needs, the service broker enables service providers 202 to specify different delivery models. The delivery models can constrain the way a service is accessed at run-time. Based on delivery needs, the service broker 204 generates the delivery logic, alleviating service providers 202 with the burden of developing and maintaining delivery logic. Example delivery models can include offline delivery, download delivery, reference delivery and mediated delivery. Offline delivery can correspond to ordering professional, human services without any run-time execution, and download delivery can correspond to downloading services to run on a client environment. Reference delivery can correspond to direct access to service endpoints in their backend environments, and mediated delivery can correspond to managed access for individual service steps through an intermediary. The service broker 204 is also equipped with service delivery business applications 226 to support service delivery on a business level. Example service delivery applications 226 can include a partner management application 228, a customer relationship management (CRM) application 230, a payments application 232 and an analytics application 234.

The service hoster 212 enables the various infrastructure services in cloud environments to be leveraged as part of provisioning an application in a business network. By way of non-limiting example, enterprise resource planning (ERP) suites can include certain types of services that can be re-hosted from their on-premise environments to cloud-based, on-demand environments. In this manner, such services could attract new users at much lower cost, without the overhead of requiring access to large application back-ends. As one example, a business network could expand sales lines by allowing small and medium enterprises (SMEs) to access a low-cost, cloud-based order-to-cash service that is integrated with on-premise ERP systems of larger companies.

A service can be automatically deployed onto a specific cloud using an interface provided by the service hoster 212. By providing a generic interface for infrastructure services, the service hoster 212 opens up the possibility to access a plurality of cloud providers through the same service hoster interface. This can be significant for business networks, because cloud services are highly commoditized with slim margins and are subject to business volatility. The service hoster 212 offers business networks partners the possibility to shift cloud providers efficiently, avoiding cloud "lock-in." Cloud services exposed to a business network can plug-in to the service hoster 212 and can be advertised through the service broker 212. When a service is to be hosted, the service broker 204 can match hosting requirements with cloud services that have the required virtual machines. Example hosting requirements can include platform service requirements and operating system requirements. The service broker 204 performs the matching and lists candidate cloud services for a user. Example user can include a service provider requiring hosting as a part of exposing a service offer in a business network, or a service consumer negotiating hosting options/costs when a service is ordered. To deploy a service into the selected cloud service of choice, the service hoster's virtualization management interface allows for interaction with specific cloud services. Once hosted, the cloud service may be monitored for performance and reliability through the service hoster interface. Monitoring information can be streamed through this interface to the service provider 202.

The service gateway 210 supports agencies in selecting a choice of solutions that provide an economies-of-scale, B2B interoperability, as a service, for their applications. Different B2B gateways and integrators have emerged for providing a rich variety of vertical B2B industry standards (e.g. PIDX, VICS) for which they provide design-time business message mapping as well as run-time message store-forward and message translation from required to proprietary interfaces of applications. This is beneficial when services are to be exposed on a business network so that they can be accessed by different partners. When a service provider exposes a service onto a business network, different service versions can be created. The different services can have corresponding interfaces that enable interactions with different message standards of the partners that are allowed to interact with the service.

Distinct as well as common message standards are supported by different B2B gateway providers. The service gateway enables a number of B2B gateways to be registered, so that their services can be accessed through a generic interface. The B2B gateway services are advertised through the service broker 204, allowing service providers 202 to search for candidate gateway services for interface adaptation to particular message standards. Key differentiators are the different pricing models, different B2B communities engaging in their hubs, and different quality of services. Some gateways are evolving into suite solutions, providing common masterdata and reference business processes in particular industries. Such gateways offer greater value for interoperability, because interoperability occurs through a reference business process context. For design-time mapping, the service hoster 212 provides model-based tooling for adapting services, regardless of which B2B gateway provider is being used. The tooling supports automated schema matching, user-specified service-to-service associations on message type and data type levels, and automatic adaptation generation.

For run-time adaptation, B2B gateways address robustness of interactions through different mechanisms (e.g., by supporting integrity checking of service invocations (e.g., whether an action is allowed on a service given its current state), message correlation, fan-out/fan-in invocations (e.g., an external invocation translate to a number of services calls in different orders) and contingency handling for service invocation failures. Like the interactions between the service broker 204 and the service hoster 212, abstract interfaces are offered for engaging, interoperating and monitoring these sorts of functions across the gateway services registered with the service gateway 210.

Service aggregators 206 select services from the service broker 204 for aggregating and repurposing the services to create a new service, and essentially, a new product offering. The service aggregator 206 on-boards and deploys this new service to the service broker 204. Further, the service aggregator 206 can drive new channels from the aggregated service, targeting specialized sectors within the financial services industry, for example.

The service aggregator 206 supports domain specialists and third-parties in aggregating services for new and unforeseen opportunities and needs. In some implementations, services may be integrated into corporate solutions, creating greater value for its users not otherwise available in their applications. In some implementations, services can be aggregated as value-added, reusable services made available for wider use by business network users. In either case, the service aggregator 206 provides dedicated tooling for aggregating services at different levels (e.g., UI, service operation, business process or business object levels). Best-of-breed service aggregation tooling and techniques can be exploited through the service aggregator 206.

Service aggregators 206 are similar to service providers 202, however, there is an important difference. Service aggregators 206 do not necessarily own all of the services that they aggregate. Instead, a service aggregator 206 can obtain custodial rights from service providers 202, for example, to repurpose services, subject to usage context, cost, trust and other factors. In some implementations, and despite new aggregated services being created, constituent services can execute within their existing environments and arrangements. In such implementations, and even though aggregated, a service can continue to be accessed through the service broker 204 based on a delivery model. The SDF 200 supports service-level agreement support through its different roles so that service providers and aggregators can understand the constraints and risks when provisioning services in different situations, including aggregation of services. The service aggregator 206 provides pure design-time tooling functionality. The service aggregator 206 interacts with the service broker 204 for discovery of services to be aggregated and for publishing aggregated services for network partners to use. The service aggregator 206 also interacts with service consumers 214 when services are consumed into existing applications.

The service channel maker 208 supports agencies in creating outlets through which services are consumed. Channels, in a broad sense, are resources, such as Web sites/portals, mobile channels and work centers, through which services are accessed by end users. Example channels can include Internet Banking, Mobile Banking and Retail Banking, respectively. The mode of access is governed by technical channels like the Web, mobile, and voice response.

The notion of channeling has obvious resonance with service brokerage. Virtually all the prominent examples of Webbased brokers expose services for direct consumption and can also be seen as channels. The SDF 200 separates designations of the service channel and the service broker 204 addresses a further level of flexibility for market penetration of services. Service channels are points of service consumption, while the service broker 204 enables accessing of services situated between channels and hosting environments where the core parts of service reside. This separation enables different service UIs and channels to be created. Different channels can be created for services registered through the same service broker 204. The SDF 200, in other words, enables consolidation of service discovery and access through the service broker 204 and independent consumption points through the service channel maker. This is particularly useful for mainstream verticals like the public sector dedicating whole-of-government resources for service discovery and access, but requiring a variety of channels for its different and emerging audiences.

The creation of a channel involves selection of services consumed through the channel, constraining which service operations are to be used, what business constraints apply (e.g. availability constraints), and how the output of an operation should be displayed (forms template) in the channel. By way of non-limiting example, and considering the structure of a Web page, service operations together with text blocks, widgets, images, tables and the like, would be selected into different parts of the page. Different service forms or outputs presented on the same page may require data field correlations. Web authoring applied specifically for services (e.g. requiring that service output be equivalently represented as text) can be supported through the service channel maker 208. Multi-modal interactions are also provided, featuring integrated conventional, spatial and voice interactions.

The service channel maker 208 interacts with the service broker 204 for discovery of services during the process of creating or updating channel specifications as well as for storing channel specifications and channeled service constraints back in the service broker 204. Channels can be discovered through the service broker 204 and allocated through a service consumer 214 for usage through designated users/groups in the business network.

The service consumer 214 completes the service supply chain, effectively fostered by the SDF 200. Through the service consumer 214, parties can manage the "last mile" integration where services are consumed through different environments. This involves the allocation of resources consuming services to consumer environments in which they operate and the interfacing of consumer environments so that the services required can be accessed at run-time in a secure and reliable way.

As discussed above, the resources that consume services are either explicit channels or applications that have services integrated ("hard-wired" into code) or accessible (through a discover/access interface). The service channel maker 208 and the service aggregator 206 support the processes of design-time integration of channels and applications, respectively. Because the allocation of applications in organizations is a specialized consideration controlled through administration systems, the service consumer 214 allocates channels in consumer environments.

The service consumer 214 supports consumer environments so that the services they require are integrated with the service broker 204 through inbound and outbound run-time interactions. As discussed above, the service broker 204 enables services to be accessed through different delivery models. Interfaces are provided on remote consumer environments so that applications running in the environments have well-defined operations that allow interactions with the service broker 204. The interfaces also ensure that invocations from the service broker 204 are free from security risks and application-specific logic when interacting with consumer environments.

Figure 3A:
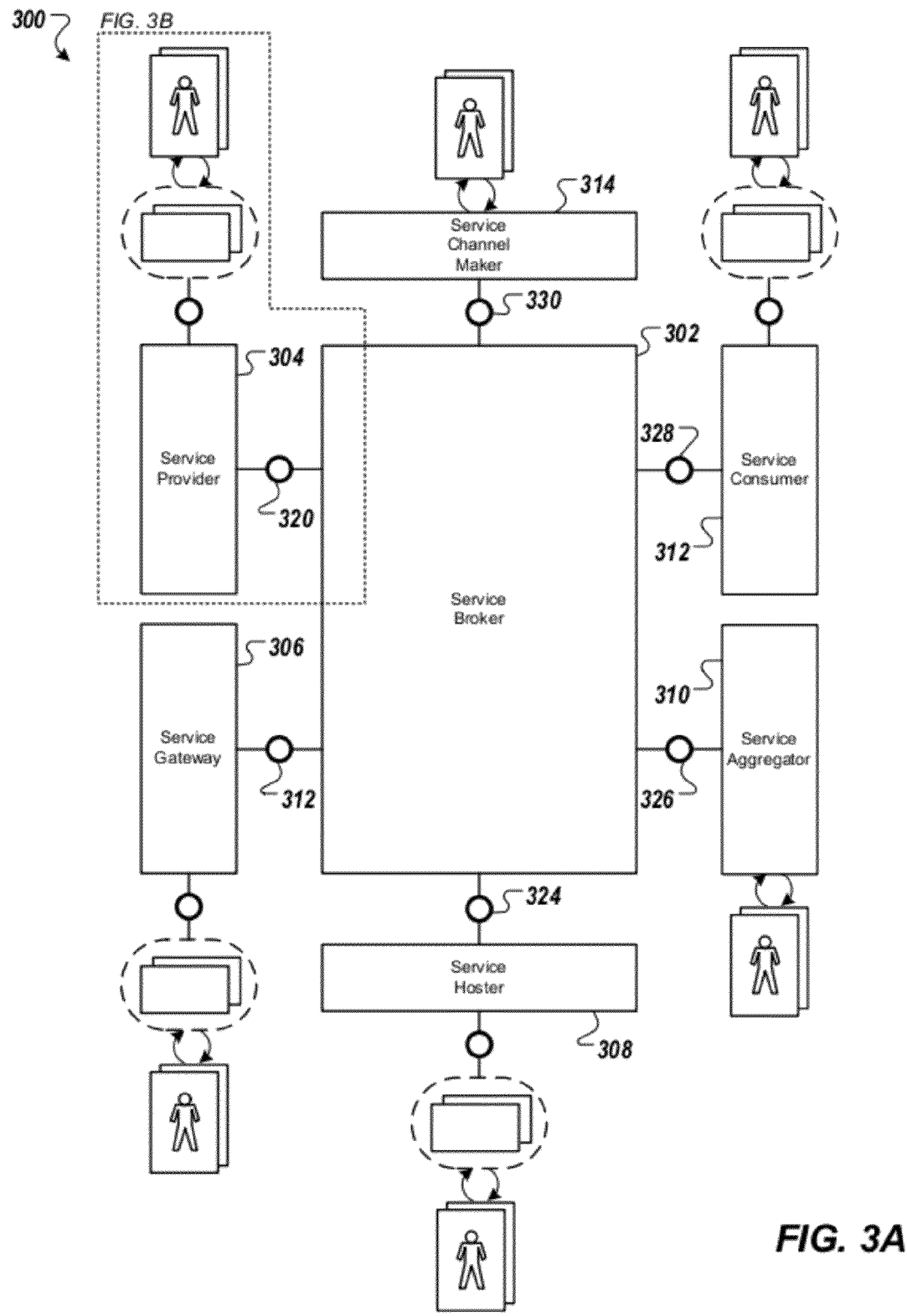
FIGS. 3A and 3B depict portions of the example SDF.
Figure 3B:
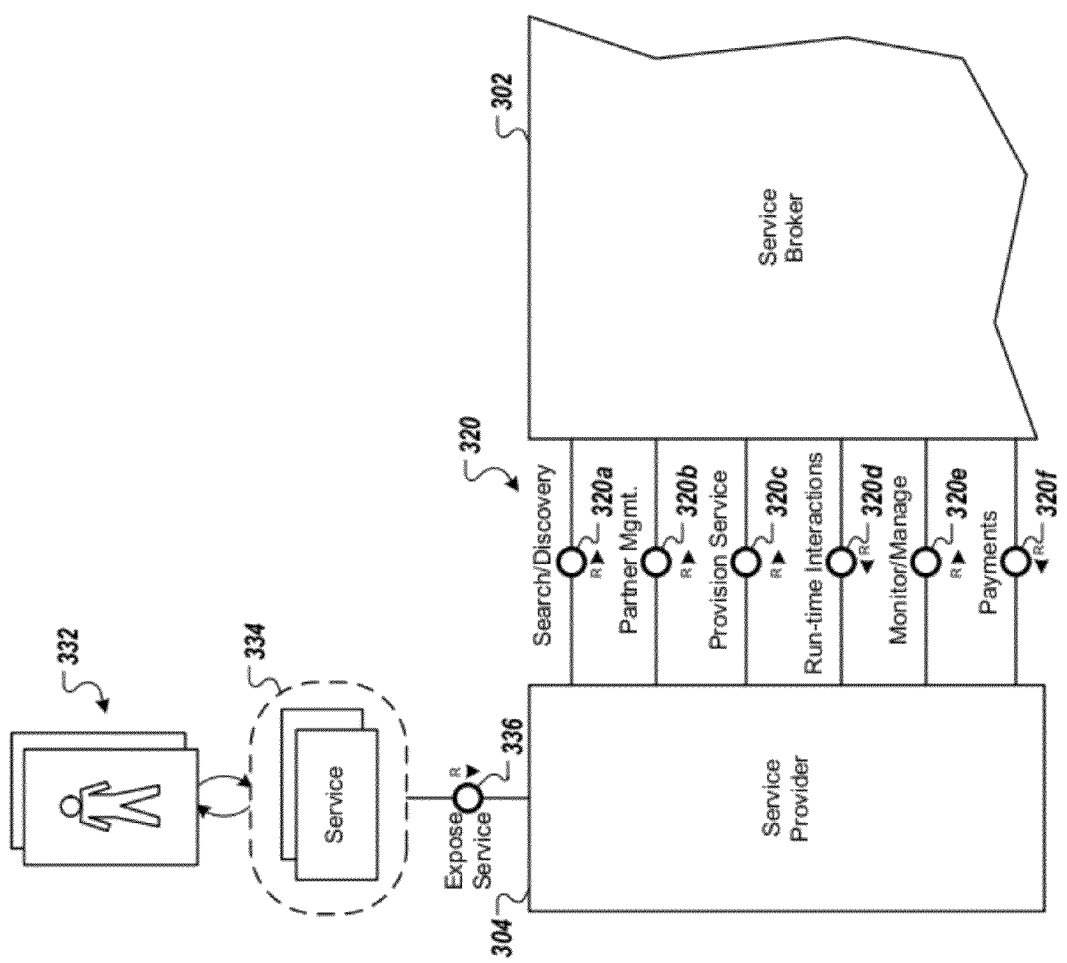

FIGS. 3A and 3B illustrate example SDF modules. As used herein, the term module can refer to one or more software programs that receive input data, process the input data to generate output data, and provide the output data in accordance with functionality described herein. In some implementations, the modules can include one or more sub-modules that operate in concert to provide the functionality discussed herein. Each module and/or sub-module can be executed using one or more computing devices. For example, and referring again to FIG. 1, each module and/or sub-modules can be executed by one or more of the client computing device 102 and the computer systems 108.

With particular reference to FIG. 3A, an example module architecture 300 is depicted. The example module architecture 300 corresponds to implementations of the SDF, discussed herein, and includes a service broker module 302, one or more service provider modules 304, one or more service gateway modules 306, one or more service hoster modules 308, one or more service aggregator modules 310, one or more service consumer modules 312, and one or more service channel maker module 314.

The service broker module 302 can include one or more modules and/or sub-modules and that can be executed using one or more computing devices (e.g., computer system 108 of FIG. 1) communicates with each of the modules 304, 306, 308, 310, 312 and 314 over one or more networks (e.g., the network 110 of FIG. 1). The service broker module 302 can communicate with the service provider module 304 through one or more application program interfaces (APIs) 320. The service broker module 302 can communicate with the service gateway module 306 through one or more APIs 322. The service broker module 302 can communicate with the service hoster module 308 through one or more APIs 324. The service broker module 302 can communicate with the service aggregator module 310 through one or more APIs 326. The service broker module 302 can communicate with the service consumer module 312 through one or more APIs 328. The service broker module 302 can communicate with the service channel maker module 314 through one or more APIs 330.

Referring now to FIG. 3B, interaction between the service broker module 302 and the service provider module 304 will be discussed. The service provider module 304 can be associated with one or more service provider entities 332 that provide one or more services 334. In some implementations, the one or more services 334 can be provided as software applications that are executed using one or more computer systems (e.g., computer system 108 of FIG. 1). The one or more services 334 can communicate with the service provider module 304 through one or more APIs 336. The illustrated API can include an expose service API that enables the service provider 332 to expose, or otherwise publish the one or more services for consumption by a service consumer through the service broker.

The service broker module 302 communicates with the service provider module 304 through the APIs 320. In the example of FIG. 3B, the APIs 320 include a search/discovery API 320a, a partner management API 320b, a provision service API 320c, a run-time interactions API 320d, a monitor/manage API 320e and a payments API 320f. Each API enables communication between the service broker module 302 and the service provider module 304 to realize functionality, as discussed in further detail herein. As one example, the search/discovery API 320a can be used to enable publication and searching of services. For example, a service can be published to a catalogue of services maintained by the service broker module 302, and the service can be searched for and discovered by a service consumer through the service broker module 302. As another example, the provision service API 320c enables a service provider and a service broker to provision services.

Interactions between the service broker module 302 and the service provider module 304 in support of service provisioning can be achieved using implementations of the SPMF, which is discussed in further detail herein. By way of non-limiting example, implementations of the SPMF can support interactions between the service broker module 302 and the service provider module 304 through the provision service API 302c. It is appreciated, however, that implementations of the SPMF, can support interactions between any modules and the service broker module 302 with respect to service provisioning.

As discussed in further detail herein, the present disclosure is generally directed to implementations of a SPMF that supports service provisioning and through which partners in global and wide-spanning business networks as well as Internet-based players can extend services for new capabilities, efficiencies and monetization. Implementations of the SPMF compile techniques for the provisioning of services through different aspects, and can include the extension of services by integrating services. Services and extended services can be brokered, interfaced through B2B gateways, hosted by cloud providers, and/or can be consumable through new Web and mobile channels. Integration steps that take part in the variety of service provisioning tasks can include integration on the user interface, business process, service interface, and/or business object aspects of services.

A multi-layered modeling approach supports the SPMF and includes a situational modeling layer and a kernel modeling layer, discussed in further detail herein. The situational modeling layer encompasses concrete modeling techniques that can directly support partners (e.g., service providers) in undertaking the different tasks of service provisioning. Service composition techniques, such as Business Process Modeling Notation (BPMN), Business Process Execution Language (WSBPEL), Service Component Architecture (SCA), and Service oriented architecture Modeling Language (SoaML) can be supported. The situational modeling layer also supports techniques for aspects such as service variant management. Tools supporting the different situational modeling techniques can manage their respective model repositories. Example tools can include an interface editor, a business process editor, a service interface editor, and a business object editor.

Because service provisioning involves integration steps, the integration specifications arising using the different situational techniques are reflected at the kernel modeling layer. At the kernel modeling layer, a Service Integration Technique (SIT) is used to uniformly view all integration specifications used through the situational modeling level for a service provisioning task. Consequently, if a number of integration steps have been used to create an aggregated service by combining user interfaces (UIs) and business processes of different services, for example, the integration specifications for the UI and business process levels can be uniformly viewed through the SIT. Models of the SIT can be persistently stored using a computer-readable repository together with non-functional and business-oriented descriptions of services. The repository can be used to manage service models and implementation artifacts (e.g. execution code, forms definitions and templates). The SPMF also supports end-to-end processes for different service provisioning tasks, guiding partners through the steps of creating brokered, channeled, hosted, B2B gateway interfaced services, and the like.

Figure 4:
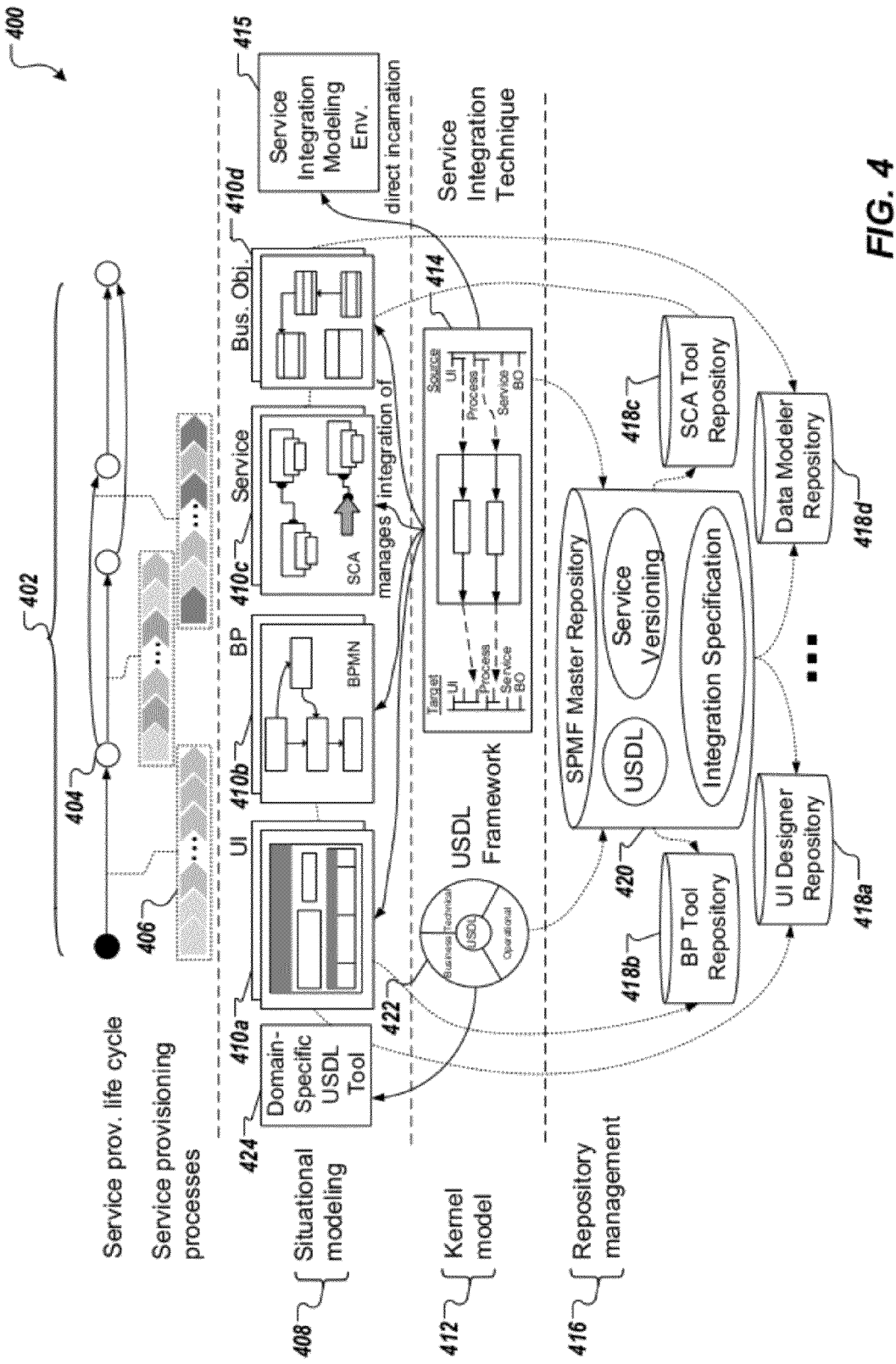
FIG. 4 depicts a block diagram of an architecture of an example service provisioning management framework (SPMF).

FIG. 4 illustrates an example SPMF architecture 400 to support service provisioning. The example SPMF architecture 400 corresponds to implementations of the SPMF described herein, and can be implemented within a SDF. The SPMF may include one or more tools for recording (or generating) and plotting a service provisioning lifecycle (402). As shown, the service provisioning lifecycle includes a plurality of stages or phases 404 that may be used to successfully provision a service. The SPMF may also include one or more tools for recording (or generating) and plotting the service provisioning processes 406 to progress from one provisioning phase to another. Service provisioning processes 406 may include one or more versioning processes which constrain how services are extended (e.g., brokered, cloud hosted, B2B gateway interfaced, etc.). A service provisioning process 406 may include integration of one or more aspects of the service (e.g., UI, business process, service interface, and/or business object) into a new context. For example, to create a brokered version of a service, the business process should be configured to be delivered through the service broker's run-time system and to utilize the service broker's business application components (e.g., payment engines).

The SPMF may support an open-ended set of techniques for service enablement and integration across different aspects of services. As shown, SPMF architecture 400 includes a situational modeling layer (408) which includes multiple editors or modeling environments (collectively 410), each modeling environment corresponding to one or more aspects of the service. For example, in some implementations, the situational modeling layer (408) of SPMF 400 includes a UI editor 410a, a business process editor 410b, a service interface editor 410c, and a business object editor 410d. Editors 410 may be provided in the form of "plug in" software modules accessed and utilized by the SPMF.

SPMF architecture 400 also includes a kernel modeling layer (412) that reflects the integration-related aspects of most or all the situational modeling techniques. In some implementations, a service integration technique (SIT) implemented through a service integration modeling environment 414 is utilized at the kernel modeling layer to equivalently express the integration specifications that are captured through the situational modeling techniques (e.g., editors or modeling environments 410). Modeling environment 414 enables the integration specifications involving different situational modeling techniques used for aspects of a service provisioning task or process 406 to be coherently viewed. Thus, for example, the UI, business process, service interface, and business object integration specifications captured through different situational modeling techniques can be uniformly expressed by using the SIT via modeling environment 414. In some implementations, the SIT can be accessed through a direct incarnation of modeling environment 415 at the situational modeling layer. This enables provisioning tasks to directly access the integration capabilities of the SIT.

SPMF architecture 400 includes a repository management layer 416. As shown, each of modeling environments 410 can be provided with a corresponding repository (collectively 418). For example, repository management layer 416 may include a UI designer repository 418a, a business process tool repository 418b, a service component architecture (SCA) repository 418c, and a data modifier repository 418d. As described above, when a service provisioning task involves integration of the service through the run-time system of a broker, techniques at the situational modeling layer can be used to capture the integration of the service's business process, interfaces and UIs with the broker's technical and business services. The models of the extended service can then be stored in repositories of the situational modeling tools used (e.g., repositories 418).

Repository management layer 416 may also include SPMF master repository 420. The integration specifications (arising from new activities or objects introduced into the extended service), new service operations, and new UI components from respective sources of the broker (also expressed in the SIT) can be stored in SPMF master repository 420. In some implementations, the master repository may make reference to models in the tool specific repositories so that business network partners may link to a service's models through different situational modeling techniques.

In addition to modeling and execution artifacts of services, descriptions of services may also be supported by the SPMF so that non-functional and functional aspects of services can be stored (e.g., in SPMF master repository 420) and discoverable. These service descriptions may be captured at the kernel modeling layer (412) using a service description language. In some implementations, the service description language is based on the Universal Service Description Language (USDL). The USDL may provide a comprehensive cataloging of services including (but not limited to): support for service ownership, various types of dependencies, pricing, availability, and service level agreements. USDL framework 422 may allow for domain-specific service description languages to be generated through a USDL tool 424 in the situational modeling layer for applications requiring service catalogs and directories.

Figure 5:
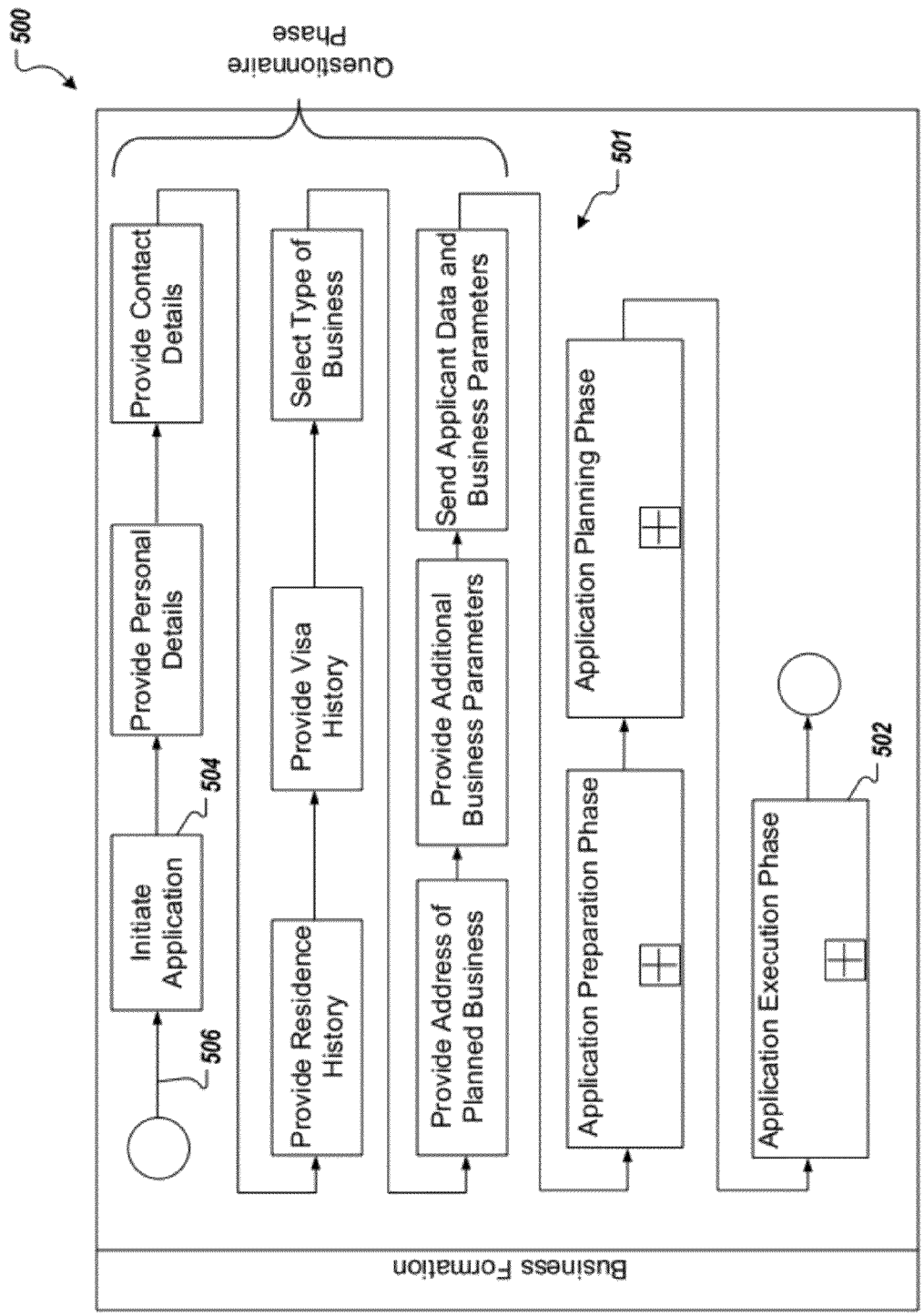
FIG. 5 depicts an example service that can be provisioned using implementations of the SPMF.
Figure 6:
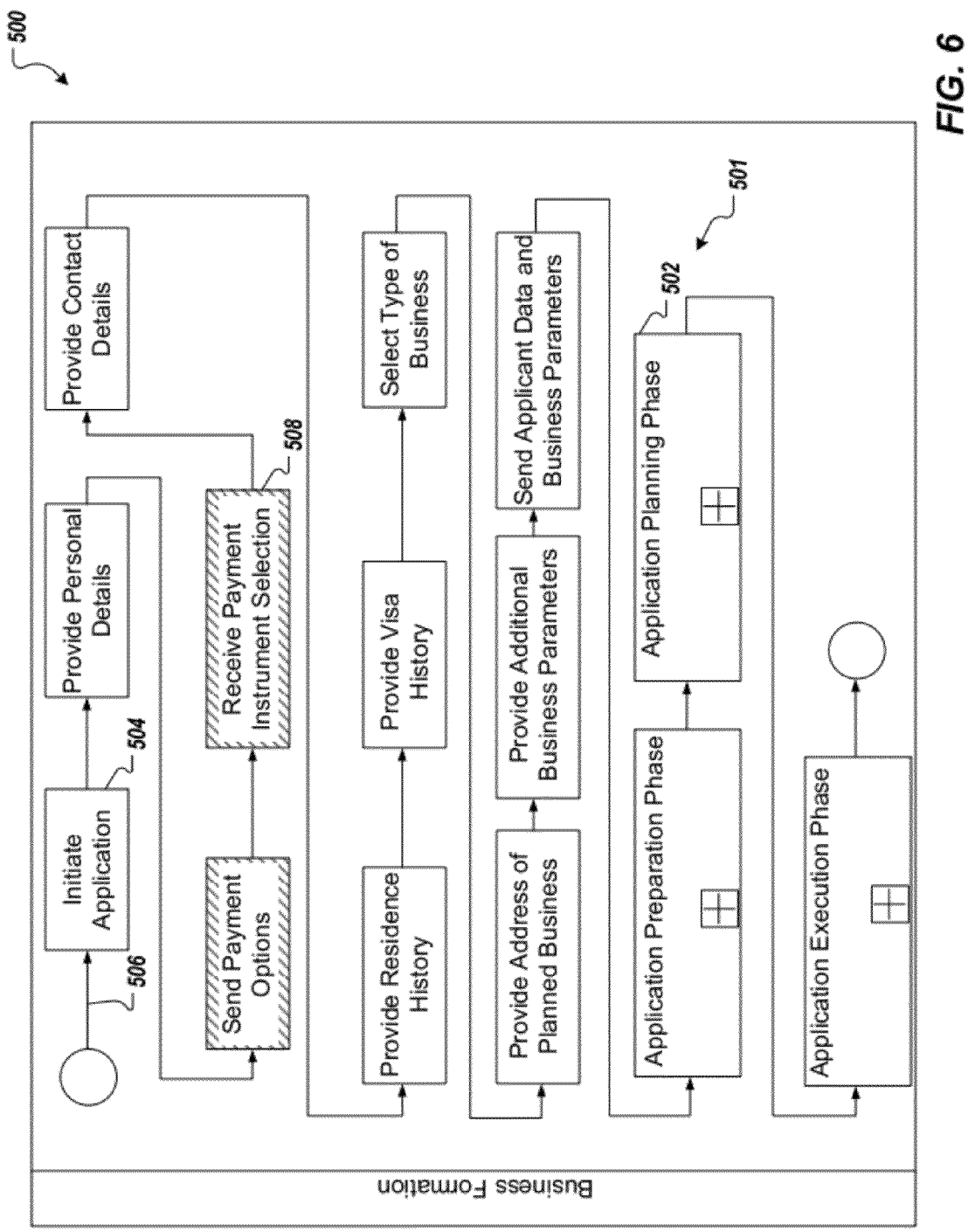
FIG. 6 depicts the example service of FIG. 5 including modifications.
Figure 7:
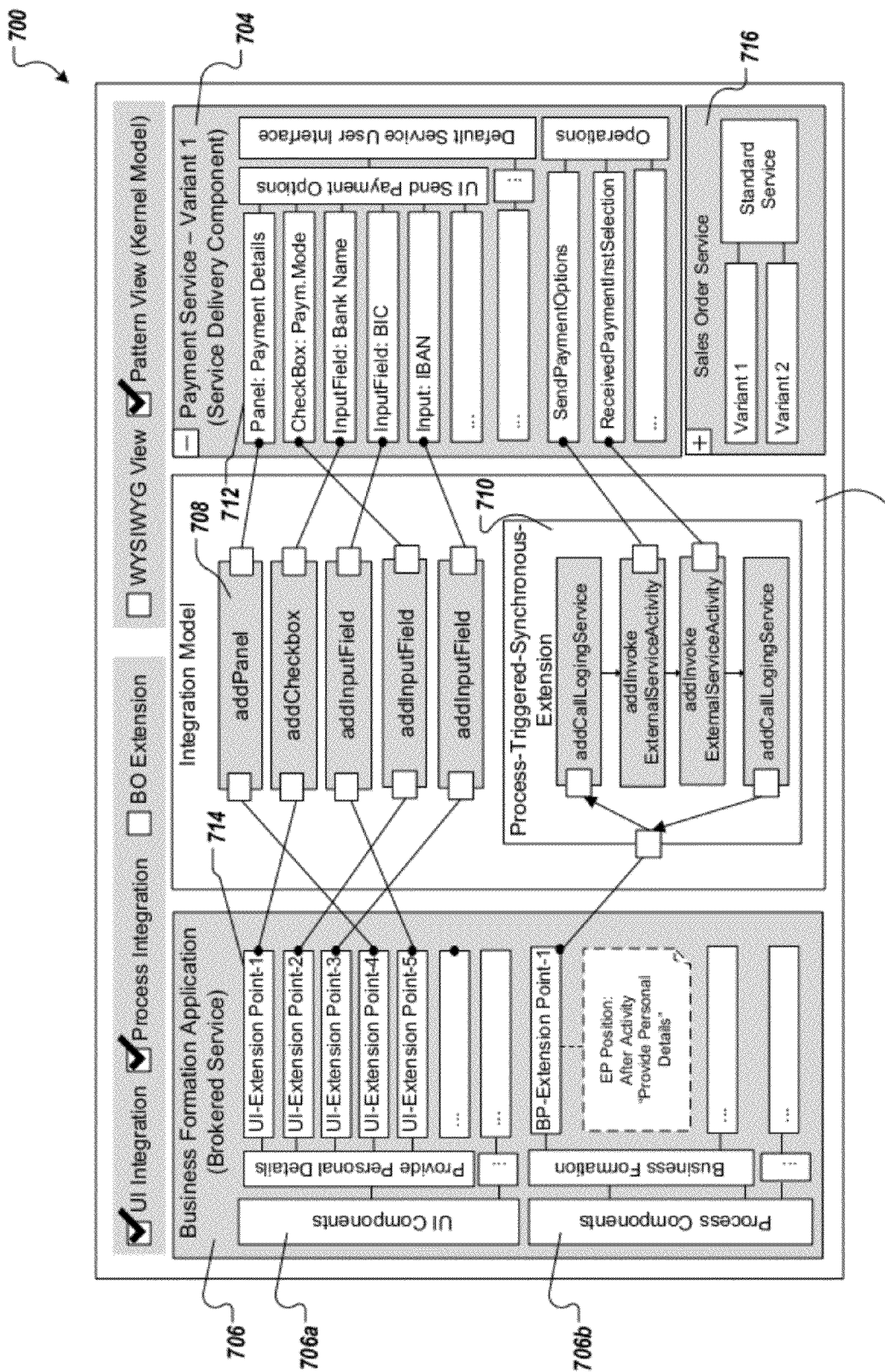
FIG. 7 depicts an example service integration modeling environment.

Referring now to FIGS. 5-7, insights into the situational modeling layer are provided and techniques that address service provisioning needs in business networks are discussed. For purposes of discussion and illustration, FIGS. 5-7 are directed to a non-limiting example of service provisioning, which can be defined as adapting a service so that it can be centrally brokered.

FIG. 5 illustrates an example situational modeling environment 500 depicting an example service 501. In this example, situational modeling environment can be provided in the form of a business process editor facilitating modification of the service to adapt the service, such that the service can be centrally brokered. The example service 500 includes a business formation service. Generally, a business formation service supports applicants of new business to obtain one or more necessary licenses (e.g., workplace health and safety licenses) granted by various agencies or governing bodies. As shown, the business formation service includes four phases (Initial Questionnaire Phase, Application Preparation Phase, Application Planning Phase, and Application Execution Phase), represented in modeling environment 500 as expandable blocks 502. Each phase can include one or more sub-processes or tasks (e.g., Initiate Application, Provide Personal Details, etc.), represented in modeling environment 500 as blocks 504. The phases and sub-processes are connected to one another by directional arrows 506 to form a flow diagram representative of the business formation service.

A business formation service may be enhanced by service brokerage through a central platform for one-stop user access and cross-agency orchestration. For access through a central broker, the business process of the service may be published in the service directory of a service broker and delivered through the service broker's run-time execution environment. Further, for the service broker to collect payments from users who access the service and disburse these to the contributing providers, the provisioning task(s) may also allow for the service to be integrated with a payment engine of the service broker.

The situational modeling environment 500 provides a modeling technique for business process configuration. As such, the modeling environment 500 can be utilized to extend one or more processes or sub-processes of a business process (e.g., the business formation process) so that selected business delivery components can be accessed by users. Business process configuration for brokerage may be based (at least in part) on the business process model of the service. For instance, in this example, the business process configuration technique provided by modeling environment 500 can facilitate extending one or more processes of the business formation service so that operations of the service broker's delivery components (e.g., payment engines) may be accessed. In this way, the service provider is not required to perform such operations. Instead, the delivery operations may be encapsulated in a set of delivery components that are called by the broker at run-time during service delivery.

To illustrate this, tasks (e.g., 504) of the example service, business formation process 501 can involve user interactions through forms (e.g., HTML forms) that are filled with the required data for each task. For example, in the task "Provide Personal Details," the service consumer (i.e., the applicant for the new business) submits data including, for example, name, address and telephone number. Furthermore, payment can be considered as an example of a delivery component, whose lifecycle can be modeled using a state machine (e.g., start to end with states in between). Using payment as a non-limiting example, a state machine defines the different states of the payment component and the order in which its operations are called. For a valid usage of the payment component, the payment states are traversed from start to end while executing the tasks specified at the transitions between states. For example, to go from a "Payment Options Available" state to a "Done Sending Payment Options" state, the payment options have to be sent.

Based on the underlying business process model and on the state machine of the delivery component, the service broker can perform delivery configuration using a service composer tool of the SPMF. The service provisioning tool can be provided as an Eclipse-based tool that enables annotation of the process tasks with, for example, pre- and post-conditions of states of the state machine model of the delivery component. Continuing with the business formation process example, for each task, a set of states can be annotated as pre/post-conditions. The set of states that can be applied to a specific task is restricted to reachable states (non-reachable states are disabled for selection). That is, for each task, a set of reachable states can be displayed in the UI of the service composer tool for selection. In order to determine the reachable states, an I-Propagation algorithm can be used to find the possible states of the delivery component at a given task. Reachable states are all states that can be reached from any state in the possible entity states not preventing another annotation later in the process to be reachable. Reachability can be computed, for example, using the Dijkstra algorithm.

The semantics of an annotation is that before (respectively after) executing the task, the annotated state has to be reached. For example, when annotating the "Provide Address of Planned Business" task with the state "Payment Collected" as a post-condition, the process has to reach the "Payment Collected" state and hence all states preceding the target state also have to be reached at this point. In the example business formation service 501, the "Provide Personal Details" task can be annotated with a "Payment Instrument Selection Received" state as a post-condition. When all states to be "woven" have been annotated and the delivery component is in its final state, the process configuration tool is ready to generate the resulting process. An example resulting process based on the example business formation process 501 of FIG. 5 is illustrated in FIG. 6, discussed in further detail below.

In general, for each task of the process (in the order of the process control flow) all annotations are collected. For each annotation, the possible entity states (PSs) are determined. For each goal setting, a chain of tasks that fulfills the goal is created.

Implementations of the SPMF further support UI extension. In particular, it may be desirable to extend UI components of a service with additional elements in order to fully integrate service delivery components. By way of non-limiting example, to integrate a part of the payment service into the business formation process (example service 501 of FIG. 5), the payment service may require that a service consumer specify payment instrument details at the UI. To accommodate this, the UI can be extended to include additional UI elements. Using tools provided in the SPMF, the service provider can specify flexible UIs with dedicated extension points, for example. Extension points provide stable anchors in the core UI component and enable a flexible extension of the UI, especially at a later stage in the software-lifecycle. In some implementations, a service can only be extended using pre-defined extension points (controlled extensibility) in order to ensure a proper lifecycle management of the brokered service.

Continuing with the example above, before the "Send Payment Options" task of the business formation service of FIG. 6 can be executed, payment details need to be entered by the service consumer into a UI form. For this purpose, an existing UI component attached to the task "Provide Personal Details" can be extended with additional UI elements in order to enter the payment instrument details. By way of non-limiting example, a new panel "Payment Details" can be inserted into the UI and can include a checkbox to select the payment mode. Additional input fields can be provided within the new panel. In the payment context, example input fields can include a bank name input field, a Bank Identifier Code (BIC) input field and an International Bank Account Number (IBAN) input field. This information can be used in the further payment relevant process steps.

Implementations of the SPMF further support service variant management. Generally, software services of companies in the corporate sector can be defined on complex applications such as enterprise resource planning (ERP) suites. For example, a payment service to support an eGovernment service broker could be derived from a complex payment engine whose complexity exceeds that required for central delivery of citizen services. This form of payment service can include various operations such as: the nomination and validation of payment instruments from customers; creation of payment apportions and schedule (e.g., revenue splitting for partners contributing to a service); collection of payment from the customer; and disbursement of funds to partners (as scheduled). In contrast to this particular B2C scope, where payments are not large and are based on discrete consumption, a "full-blown" payment engine addressing payments in the ERP and B2B contexts involves larger amounts of money through continuous partner relationships. Therefore, its payment operations are more complex.

There are more complex data objects and differences in the details of the data structure in the standards for different industries. To be applicable in various applications within several industries, a general purpose business service should support all options and specific features that are relevant for the targeted usage industries. Accordingly, a corresponding UI can become quite complex in terms of the number operations, the size of input and output objects, and the conditions and constraints for proper and consistent consumption. A specific application, which is reduced in scope and only needs a subset of the provided features, relies on adaptation for its particular needs. In practice, this can be a non-trivial and time consuming task that requires expensive consultancy.

To better support the provisioning and consumption of such business services, an integrated service variant management technique is provided to enable a stepwise reduction of the complexity, along with tool support for the customization tasks. For service variant management, a starting point includes a given business service that provides access to standard business facilities. All features and various usage options that are desirable in the various foreseen application scenarios can be defined. By way of non-limiting example, a sales order service enables the inclusion of individual sales order items and covers many standards for specific industries. To enable consumption through simplified and customized service variants, a domain expert prepares the service by defining different variants that are pre-configured for specific user groups (e.g., a variant for the automotive industry, a variant for the telecommunications industry, and/or a variant for the public sector). Furthermore, detailed usage conditions for each variant can be described. In terms of functional aspects, this covers the explicit declaration of mandatory and optional operations, messages, and message types as well as the dependencies among them; additional variability models and management techniques can be defined for business-relevant aspects such as quality-of-service indicators, service-level agreements (SLAs), or usage and pricing models. Everything is captured in a Variability Specification Model (VSM) that can be part of a common meta-model. The common meta-model can define the constructs to model variability. Multiple VSMs can be provided for different application scenarios.

A built-in extractor facility can be used to automatically generate a skeleton that encompasses the corresponding variability modeling elements for all operations and data types defined in the original service description. The extractor facility also accounts to implicit variability constraints taken from the service interface and type declarations. Explicit variability information can be added. By way of non-limiting example, a usage option for including a sales order item into a created sales order object can require the provision of the item's internal identification number and the requested quantity. This can be modeled through constraints stating that the usage of the operation for creating a sales order with an included sales item requires the requested quantity as mandatory input.

On the basis of a chosen variability specification, a service consumer can adapt the service to the individual consumption context by creating a personalized variant. The SPMF supports this through intuitive tools with graphical user interfaces (GUIs) that enable non-technology experts to perform the customization. Using the GUI, the service consumer selects the desired features and may specify concrete values for static parameters that are not changed dynamically during invocation of the service. Some elements can be pre-selected (e.g., elements that are mandatory for correctly invoking the service). In some implementations, the service consumer can select the operations and data types that are relevant for the specific application purpose. The built-in mechanisms for validating the usage conditions (defined in the chosen variability specification) ensure the correct consumption of the service. For example, the tool ensures that the input fields for the requested quantity of sales order items are included in the consumer variant.

A technical service interface for the personalized consumer variant is automatically generated. The technical service variant can be used to invoke the original business service, being significantly less complex while ensuring a correct and consistent consumption. The SPMF also supports the stepwise creation of customized service variants for various service description models such as WSDL, SoaML, and particularly USDL.

Situational modeling techniques have been described above to model the integration of a service delivery component (e.g., payment service) into a brokered service (e.g., business formation service) on a UI and process layer. On both layers, a series of integration steps is captured using the individual situational modeling techniques.

FIG. 6 illustrates situational modeling environment 500 supporting an extended model of a business formation service that is generated based on an example annotation of the business formation process of FIG. 5. As shown, and as discussed above, the business formation process (as shown in FIG. 5) has been extended to include two additional tasks ("Send Payment Options" task and "Receive Payment Instrument Selection" task), represented in the modeling environment as blocks 508. The additional tasks 508 represent the transitions from "Start" state to the "Payment Instrument Selection Received" state of a payment delivery component integrated into the business formation process 501. The addition of tasks 508 between the "Provide Personal Details" task and the "Provide Contact Details" task are described below with respect to the kernel modeling layer using the SIT.

As discussed above, in the kernel modeling layer of the SPMF, most or all overarching integration steps (e.g., the addition of one or more tasks to a business process as illustrated in FIG. 6) can be captured in a uniform manner using the SIT. The SIT enables modeling of the overarching integration concerns as integration activities on multiple layers. A pattern-based modeling approach may provide a controlled extensibility of a brokered service (e.g., a business formation service) to integrate a new service along a restricted proven set of integration operations. Classes of similar integration activities can be abstracted into integration patterns that capture the common attributes and configuration parameters. In some implementations, the SIT is based on a modeling concept including a set of selected or predefined, and extensible integration patterns. For example, the SIT may be based on an atomic integration pattern describing fine-grained integration steps (e.g., adding a UI panel to a UI panel set or calling a logging service in a process step), or a complex integration pattern. Complex integration patterns model more coarse-grained integration steps which group one or more instances of atomic or complex patterns into a pattern template for later re-use. An integration specification may describe the integration aspects for the combination of a brokered service and a service offered by a broker by the instantiation and parameterization of one or more integration patterns (e.g., atomic or complex integration patterns).

As described above, an SIT tool may support the modeling of integration specifications. In accordance with the SPMF architecture (see FIG. 4), integration specifications, which may contain references to models in various situational model repositories, can be managed in a central integration specification repository. FIG. 7 illustrates an example SIT modeling environment 700 (i.e., a service integration modeling environment) providing a pattern-based view of an integration specification. In some examples, other views of the integration specification may be provided by modeling environment 700. For example, modeling environment 700 may provide a WYSIWYG-view (what-you-see-is-what-you-get-view), to allow the SIT to be directly used in the situational modeling layer. The content of FIG. 7 is based on the example business formation process and UI integration discussed above with regard to FIGS. 5 and 6.

As shown, the pattern view provided by SIT modeling environment 700 includes an integration model 702, representing the integration specification. In some implementations, the integration specification can be expressed in a dedicated pattern-based modeling language for the service integration domain. Thus, integration across several aspects of a target service being brokered, and thus provisioned, can be expressed in a single, uniform integration model (e.g., integration model 702 which represents integration across the UI and business process aspects of a business formation service). As noted above, an integration specification may describe the integration of a service delivery component 704 (e.g., new or extended service UIs, business processes, operational interfaces, and/or business objects) into a base service specification 706. In this example, the integration specification describes the integration of a payment service (704) offered by a service broker into a business formation service (706). Additionally, in this example, the modeled integration is realized on both the UI 706a layer and process layer 706b of the service. As such, the integration specification (depicted as integration model 702) includes several instances of atomic patterns 708 (e.g., 'addPanel', 'addCheckBox', 'addCallLoggingService', etc) and an instance of a complex pattern 710 ('Process-Triggered_synchronous-Extension'). As shown, one or more of the integration patterns may link some extension points of service delivery component 704 (via application reference ports 712) with elements of service specification 706 (via service reference ports 714). For instance, in this example, an atomic pattern instance 'addPanel' is linked to a UI extension point (which may allow for a panel to be added to the brokered service UI) of the brokered service and a UI reference point 'Payment Details' from a sample UI of the payment service. Complex pattern instance 710 is utilized in a similar manner to link process points of service delivery component 704 (e.g., 'SendPaymentOptions') with process elements of service specification 706 ('Provide Personal Details').

In some implementations, complex services can be described within the kernel modeling layer. A complex service may include one or more service variants. For example, a comprehensive payment engine provided by a broker for use in a brokered service (e.g., a business formation service) may be partitioned into subsets or variants of reduced scope for use in particular applications of the service specification.

Variants of a complex service may be imported into the kernel model layer. For example, a variability specification model 716 may be imported into SIT modeling environment 700. Integration patterns can then be utilized to integrate selected variants of the complex service into the targeted service being provisioned.

Many aspects of the present disclosure have been described within the context of an example business formation service. Such aspects and implementations are, of course, not limited to this context. More specifically, the SDF and SPMF may be applied to any service. Further, although service provisioning has been described herein within the context of service brokering, other service provisioning tasks (e.g., cloud hosting, B2B gateway interfacing and UI channeling) can also be supported by the SPMF.

Figure 8:
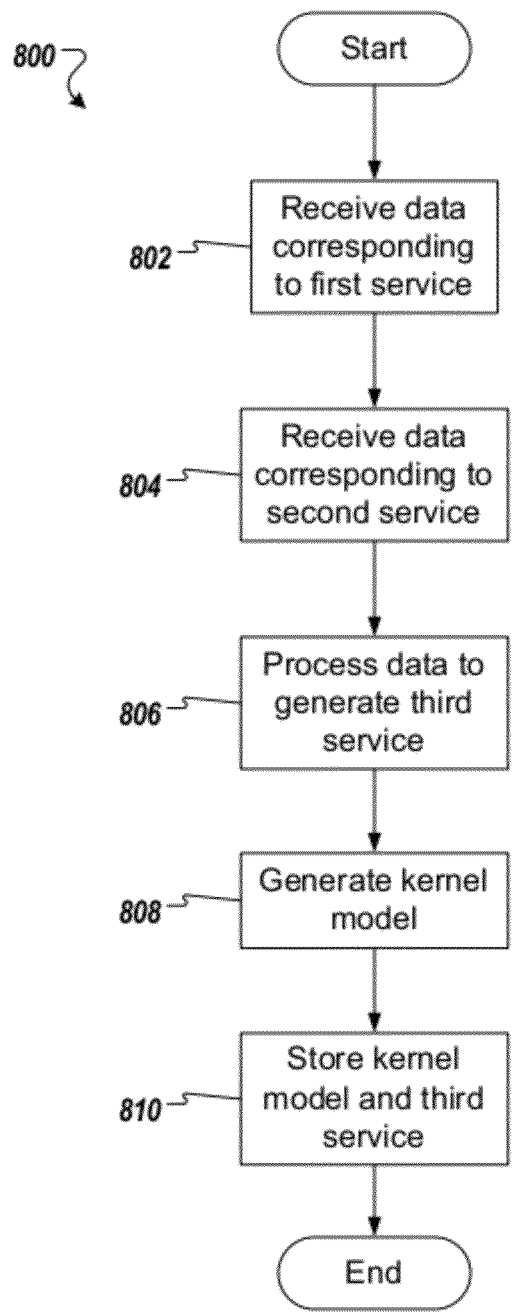
FIG. 8 is a flowchart of an example process that can be executed in implementations of the present disclosure.

FIG. 8 is a flow diagram of an example process 800 executed using an SPMF in accordance with implementations of the present disclosure. The example process 800 can be executed to provision services in a business network. Data corresponding to a first service is received (802). For example, the data corresponding to the first service can be received at one or more processing devices. Data corresponding to a second service is received (804). For example, the data corresponding to the first service can be received at the one or more processing devices. The first and second services include services that can be computer-executed, as discussed in further detail herein.

The data corresponding to the first service and the data corresponding to the second service are processed to define a third service (806). For example, the data can be processed using a computer-executable tool selected from a plurality of computer-executable tools to define a third service. The third service can include an integration of the first service and the second service. The processing can be performed in the situational modeling layer of implementations of the SPMF, discussed in detail herein. A kernel model corresponding to the third service is generated (808). For example, generation of the kernel model can be performed in a kernel modeling layer of implementations of the SPMF, discussed in detail herein. The third service and the kernel model are stored in computer-readable memory (810).

Figure 9:
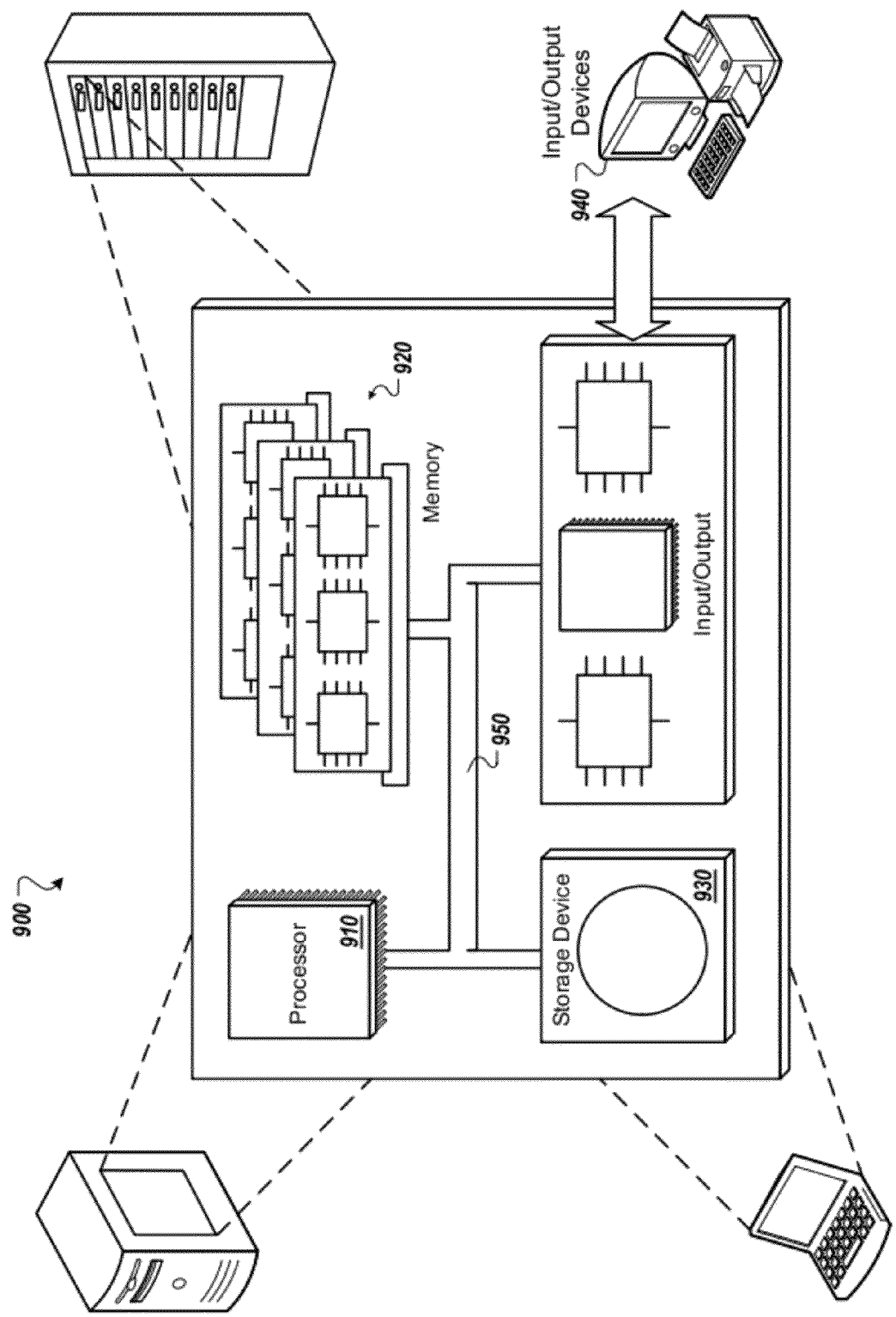
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for provisioning services in a business network, comprising:

receiving, by one or more processing devices, data corresponding to a first service;

receiving, by the one or more processing devices, data corresponding to a second service;

processing, by the one or more processing devices, the data corresponding to the first service and the data corresponding to the second service using a computer-executable tool selected from a plurality of computer-executable tools to enable provisioning of a service using the business network, and the processing being performed in a situational modeling layer of a service provisioning framework;

generating a kernel model corresponding to the service, the generating being performed in a kernel modeling layer of the service provisioning framework, wherein processing the first service and the second service generates integration specifications, the kernel model being generated based on the integration specifications; and storing the kernel model in computer-readable memory, wherein the service comprises a third service, the third service comprising an integration of the first service and the second service; and wherein the third service comprises a brokered version of the first service, and is configured to be delivered through a run-time system of a service broker.

2. The method of claim 1, wherein the kernel model manages integration of input provided from each of the plurality of computer-executable tools.

3. The method of claim 1, further comprising displaying the kernel model on a display device.

4. The method of claim 1, wherein the third service is configured to utilize components of the service broker based on the second service.

5. The method of claim 1, wherein the first service is provided by a first service provider and the second service is provided by a second service provider.

6. The method of claim 1, further comprising:
receiving user input, the user input being provided through the computer-executable tool; and
annotating one or more tasks of the first service based on the user input to provide one or more annotations, each of the one or more annotations defining a condition of a state of a state machine that corresponds to the second service.

7. The method of claim 6, further comprising identifying a set of reachable states based on a task of the one or more tasks, wherein the one or more annotations of the task correspond to a reachable state of the set of reachable states.

8. The method of claim 6, further comprising:
for each task in the first service, collecting all annotations;
for each annotation, determine possible entry states; and
generating a chain of tasks based on the possible entry states, the chain of tasks being integrated into the first service.

9. The method of claim 1, further comprising selecting the second service from a plurality of second services, each second service in the plurality of second services corresponding to a variant of the second service.

10. The method of claim 9, wherein each variant is an industry-specific variant of the second service.

11. The method of claim 9, wherein the kernel model reflects each variant of the second service.

12. The method of claim 1, wherein the service comprises at least one of a provisioning service, an aggregating service, cloud-hosting service, gatewaying service, and a channeling service.

13. The method of claim 1, further comprising providing a computer-readable repository for each computer-executable tool of the plurality of computer-executable tools.

14. The method of claim 1, further comprising storing non-functional descriptions and business-oriented descriptions corresponding to the first service and the second service in computer-readable memory.

15. The method of claim 1, wherein each computer-executable tools corresponds to a respective situational modeling technique.

16. The method of claim 1, wherein the plurality of computer-executable tools comprising a user-interface editor, a business process editor, a service interface editor and a business object editor.

17. A non-transitory computer-readable storage medium coupled to one or more processing devices and having instructions stored thereon which, when executed by the one or more processing devices, cause the one or more processing devices to perform operations comprising:
receiving data corresponding to a first service;
receiving data corresponding to a second service;
processing the data corresponding to the first service and the data corresponding to the second service using a computer-executable tool selected from a plurality of computer-executable tools to enable provisioning of a service using a business network, and the processing being performed in a situational modeling layer of a service provisioning framework;
generating a kernel model corresponding to the service, the generating being performed in a kernel modeling layer of the service provisioning framework, wherein processing the first service and the second service generates integration specifications, the kernel model being generated based on the integration specifications; and
storing the kernel model in computer-readable memory,
wherein the service comprises a third service, the third service comprising an integration of the first service and the second service; and
wherein the third service comprises a brokered version of the first service, and is configured to be delivered through a run-time system of a service broker.

18. A system, comprising:
one or more computing devices; and
a computer-readable storage device coupled to the one or more computing devices and having instructions stored thereon which, when executed by the one or more computing devices, cause the one or more computing devices to perform operations comprising:
receiving data corresponding to a first service;
receiving data corresponding to a second service;
processing the data corresponding to the first service and the data corresponding to the second service using a computer-executable tool selected from a plurality of computer-executable tools to enable provisioning of a service using a business network, and the processing being performed in a situational modeling layer of a service provisioning framework;
generating a kernel model corresponding to the service, the generating being performed in a kernel modeling layer of the service provisioning framework, wherein processing the first service and the second service generates integration specifications, the kernel model being generated based on the integration specifications; and
storing the kernel model in computer-readable memory, wherein the service comprises a third service, the third service comprising an integration of the first service and the second service; and wherein the third service comprises a brokered version of the first service, and is configured to be delivered through a run-time system of a service broker.

* * * * *